United States Patent
Aswadhati

(10) Patent No.: US 8,514,712 B1
(45) Date of Patent: Aug. 20, 2013

(54) NON-STOP VOIP SUPPORT

(75) Inventor: Ajoy Aswadhati, Cupertino, CA (US)

(73) Assignee: Force10 Networks, Inc., San Jose, CA (US)

( * ) Notice: Subject to any disclaimer, the term of this patent is extended or adjusted under 35 U.S.C. 154(b) by 1056 days.

(21) Appl. No.: 12/315,372

(22) Filed: Dec. 2, 2008

Related U.S. Application Data

(60) Provisional application No. 61/005,571, filed on Dec. 6, 2007.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/235; 370/352; 370/356; 370/390; 726/22

(58) Field of Classification Search
None
See application file for complete search history.

(56) References Cited

U.S. PATENT DOCUMENTS

| | | | |
|---|---|---|---|
| 2004/0073940 A1* | 4/2004 | Chen et al. | 725/111 |
| 2005/0083952 A1* | 4/2005 | Swain | 370/401 |
| 2005/0264420 A1* | 12/2005 | Vogel et al. | 340/572.1 |

* cited by examiner

*Primary Examiner* — Asad Nawaz
*Assistant Examiner* — Justin N Mullen
(74) *Attorney, Agent, or Firm* — Haynes and Boone, LLP

(57) ABSTRACT

A packet switch collects configuration information on the peer devices to which it connects. Peer devices that are IP (Internet Protocol) telephones are sensed. Such devices may also bridge packets to a connected device such as a computer, but with a bridge capability that cannot handle large broadcast storms on the network. The packet switch uses the configuration information to limit broadcast storms on its ports connected to the relatively fragile IP telephones/bridges. This can prevent broadcast storms from disrupting calls on the IP telephones connected to the packet switch.

21 Claims, 4 Drawing Sheets

| SLOT ID | PORT | LLDP CHASSIS, PORT, TTL | LLDP SYSTEM CAPABILITIES | LLDP-MED DATA | BSC STATUS |
|---|---|---|---|---|---|
| 0 | 1 | | | | ON |
| 0 | 2 | | | | ON |
| 0 | 3 | | | | ON |
| 0 | 4 | | | | ON |
| 0 | 5 | | | | ON |
| 0 | 6 | | | | OFF |
| ... | ... | ... | ... | ... | ... |
| 0 | 48 | | | | ON |
| 1 | 1 | | | | OFF |
| 1 | 2 | | | | OFF |
| 1 | 3 | | | | ON |
| 1 | 4 | | | | ON |
| 1 | 5 | | | | OFF |
| 1 | 6 | | | | OFF |
| 1 | 7 | | | | OFF |
| ... | ... | ... | ... | ... | ... |
| 1 | 48 | | | | ON |

NON-STOP VOIP SUPPORT

CROSS-REFERENCE TO RELATED APPLICATIONS

This application claims priority to co-owned, co-pending U.S. Provisional Patent Application Ser. No. 61/005,571, filed Dec. 6, 2007, by Ajoy Aswadhati, entitled NON-STOP VOIP SUPPORT, which is incorporated herein by reference in its entirety.

BACKGROUND

1. Field of the Invention

The present disclosure relates generally to packet network devices, and more particularly to intelligent control of traffic to IP (Internet Protocol) telephones.

2. Description of Related Art

Traditional analog phones transmit and receive voice-band analog signals on a dedicated telephone circuit. In contrast, an IP phone connects to a packet data network (Internet Protocol is a common packet format for "IP" phones, but the use of such phones is not limited to IP packet networks). Voice data is digitized, compressed, and transmitted by an IP phone in voice data packets according to one of several available protocols. Received voice data packets are buffered, decompressed, reconstructed, and converted back to analog form for playout to the user as if the user were talking on a traditional analog phone.

IP phones typically connect to a local area network (LAN). When a user dials a traditional telephone number on the IP phone, the IP phone contacts a known call management server (commonly called a "gatekeeper"), which may reside on the LAN, or on a Metropolitan Area Network or Wide Area Network reachable through the LAN. The call management server sets up the call with reference to its own policies and by exchanges, if necessary, with another server that manages the called station or an access point to that station. The call management server then instructs the IP phone how to contact the desired endpoint, either through the LAN, through a WAN, or through an access server that terminates the VoIP packet aspect of the call at a gateway to a traditional telephone network, which carries the call the rest of the way to its destination.

FIG. 1 shows some components of a LAN 100 that supports IP phone service. A switch S1 connects through one or more switch ports to a network 110 (a single network link NL1 is shown, although typically others will exist as well). Three other illustrated switch ports connect S1 to three IP phones (IPP1, IPP2, and IPP3) through three packet data links (L1, L2, and L3), respectively. A fourth illustrated link L4 connects S1 to an endpoint C1, shown as a computer (a computer may also contain a "soft" IP phone, e.g., software to place and receive calls over the packet network through the computer's network interface).

LAN 100 may be, for instance, an enterprise packet data network, with other switches and routers (not shown) to connect the illustrated systems to other sections of the LAN, enterprise servers, and the "outside" world. A gatekeeper GK1 also connects to network 110 through a network link NL2. IP phones IPP1, IPP2, and IPP3 communicate with gatekeeper GK1 to set up calls, either to each other, other LAN phones, or outside phones. Although call setup messaging is coordinated through GK1, once a call is set up (e.g., between IPP1 and IPP2), the voice data protocol negotiation and data packets pass directly between IPP1 and IPP2 via switch S1.

One common feature of desktop-type IP phones is the presence of two packet data ports. This allows the IP phone to connect to the LAN, as well as another network appliance, such as a computer, and thus allows both devices to access the LAN through a single network jack and cable. The IP phone allows the other network appliance to connect to the LAN through the IP phone. Bridge logic in the IP phone transfers packet traffic between the two packet data ports, while extracting/inserting call setup packets, voice data packets, and other IP phone-feature packets on the port connected to the LAN. Because IP phone traffic only uses a fraction of the bandwidth available on a typical LAN connection, a computer or other network appliance can utilize the extra bandwidth, allowing both the IP phone and network appliance to communicate simultaneously with the LAN over the single LAN connection. For instance, in FIG. 1 an endpoint C2 connects to IPP2 through a link L5, and an endpoint C3 connects to IPP3 through a link L6. Thus C2 and IPP2 effectively share link L2 to switch S1, and C3 and IPP3 effectively share link L3 to switch S1.

BRIEF DESCRIPTION OF THE DRAWINGS

The present invention can be best understood by reading the specification with reference to the following Figures, in which:

FIG. 4 illustrates a database table for maintaining device status and broadcast storm protection status for devices connected to the ports of a switch.

DETAILED DESCRIPTION

The embodiments presented herein allow a packet switch to automatically protect IP phones connected to its ports from network traffic conditions that could cause a loss of IP phone connectivity. Voice-over-IP (VoIP) services require low packet latency and low inter-packet jitter to produce acceptable call quality. Furthermore, it is recognized herein that IP phones, which are optimized for voice processing and low-rate packet communications, generally cannot handle demanding control/background traffic tasks and continue to provide acceptable—or any—voice service. In the embodiments below, a switch recognizes which of its ports are connected to IP phones, and implements special packet filtering for egress traffic on those ports.

One condition that can potentially interfere with the proper operation of an IP phone is a "broadcast storm." A broadcast storm most often occurs in a LAN when, maliciously or inadvertently, one or more devices causes a large number of network devices to issue LAN broadcast control packets at roughly the same time. When these packets are broadcast to the IP phone's lightweight switch, the IP phone must process them. The number of CPU cycles and/or buffer space required to process the broadcast packets may overwhelm the IP phone processor, causing difficulties in timely processing of the voice and/or control packets required to place or maintain a call.

In the embodiments described below, conditions such as broadcast storms are automatically controlled on a port when a switch senses that the port connects to an IP phone. This control allows an enterprise VoIP implementation on a shared data network, for example, to remain functional even at times when the network control traffic is high.

Figure 1:
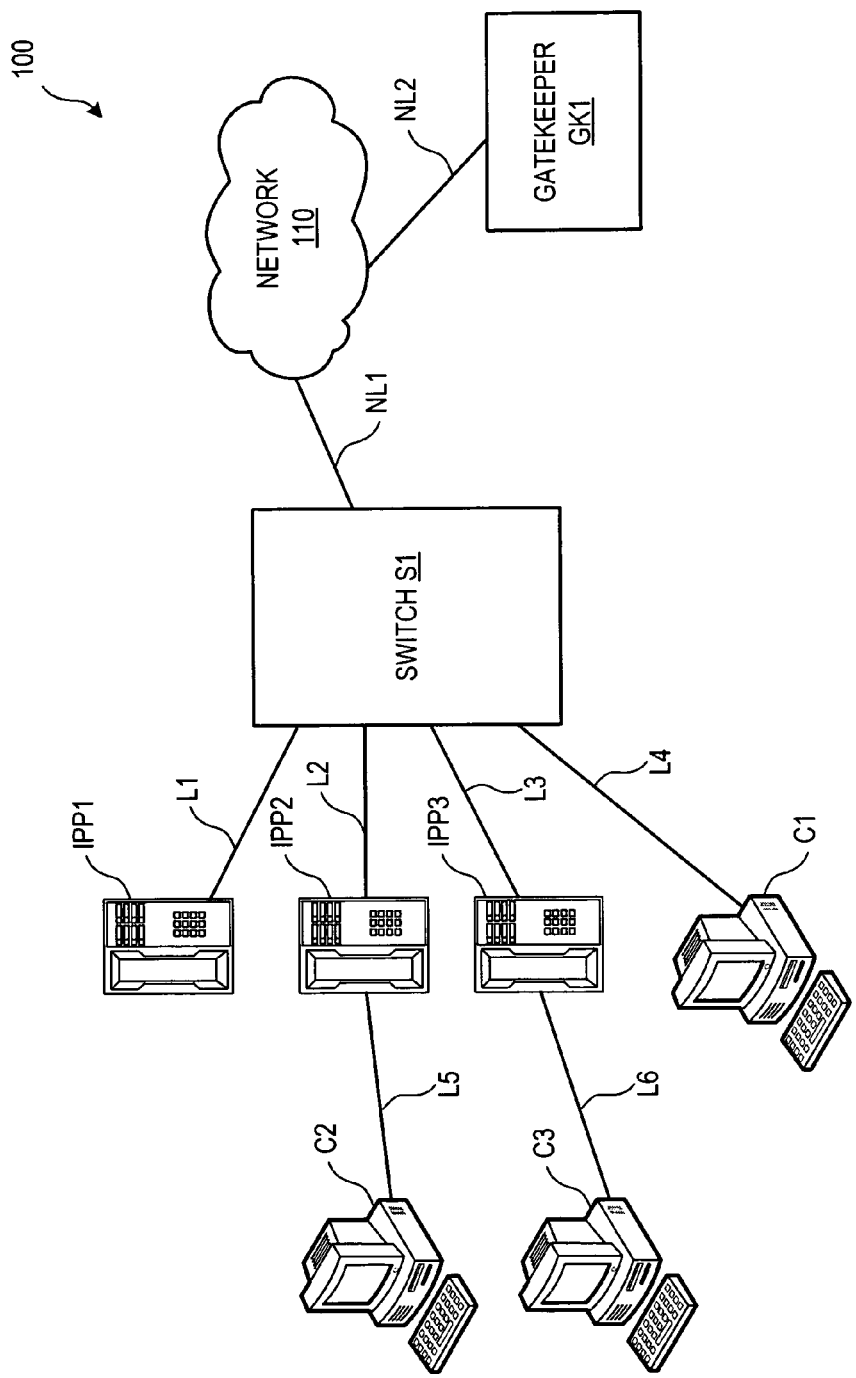
FIG. 1 illustrates a prior art network diagram including IP phone capabilities.
Figure 2:
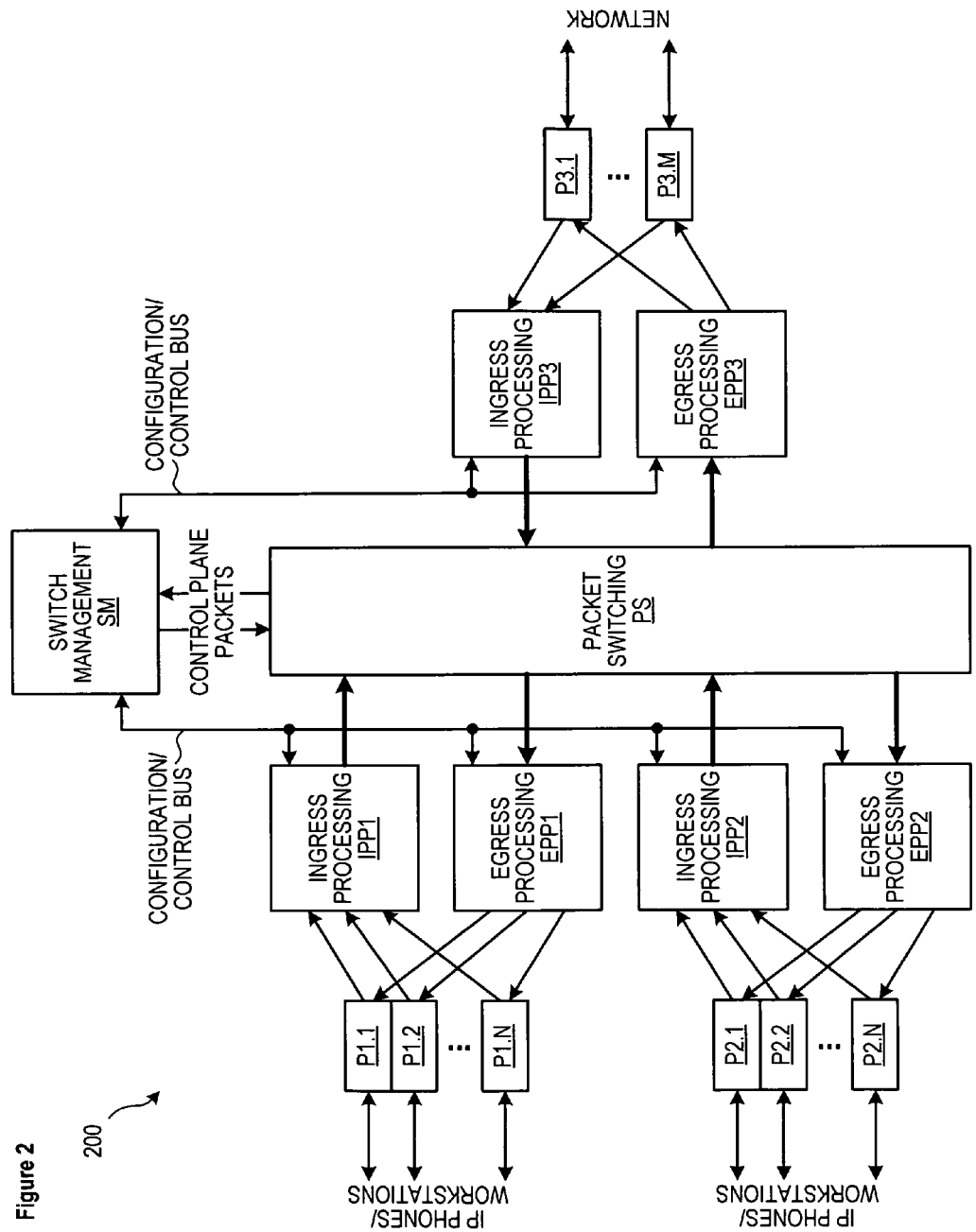
FIG. 2 contains a block diagram for an exemplary packet switch capable of implementing an embodiment.

FIG. 2 contains a functional block diagram for an exemplary packet switch 200 useful with embodiments. Packet switch 200 comprises three sets of ports P1.1-P1.N, P2.1-P2.N, and P3.1-P3.M, each set served respectively by one of three ingress processing functions IPP1, IPP2, and IPP3, and one of three egress processing functions EPP1, EPP2, and EPP3. Each set of ports and related processing functions may exist, e.g., on a line card of a modular switch having multiple slots for accommodating some number (usually more than three) line cards. A switch management function SM handles control plane packet processing for the switch 200 and configuration of the various switch components. A packet switching function PS (which may be distributed on the line cards, a management card, and/or on one or more switch fabric cards) passes packet data traffic between the ingress processing functions and the egress processing functions, and passes control packet traffic between each of these functions and the switch management function SM.

In a typical embodiment, some line cards have a large number of lower-speed ports (e.g., 10/100 Megabit-per-second ("Mbps") Ethernet or possibly 1 Gigabit-per-second ("Gbps") Ethernet ports) and some line cards have a smaller number of higher speed (e.g., 1 Gbps Ethernet, 10 Gbps Ethernet, etc.) ports. The line cards with high port density and lower speed connections are used to connect to workstations, IP phones, printers, wireless access points, and other end stations resident on a LAN. Some such cards also have PoE (Power-over-Ethernet) capability, allowing switches to provide DC power directly to IP phones, wireless access points, and the like. The line cards with lower port density and higher speed connections connect to other LAN switches, routers, high-speed servers, and the like.

The switch management function SM controls the forwarding state of each switch port according to the result of various control packet protocol exchanges with its neighbors, and also learns the MAC (Media Access Control) addresses of devices reachable through each port. A configuration/control bus allows the switch management function to share this information with the ingress and egress processing functions, thus allowing packets to be forwarded effectively through the switch.

Figure 3:
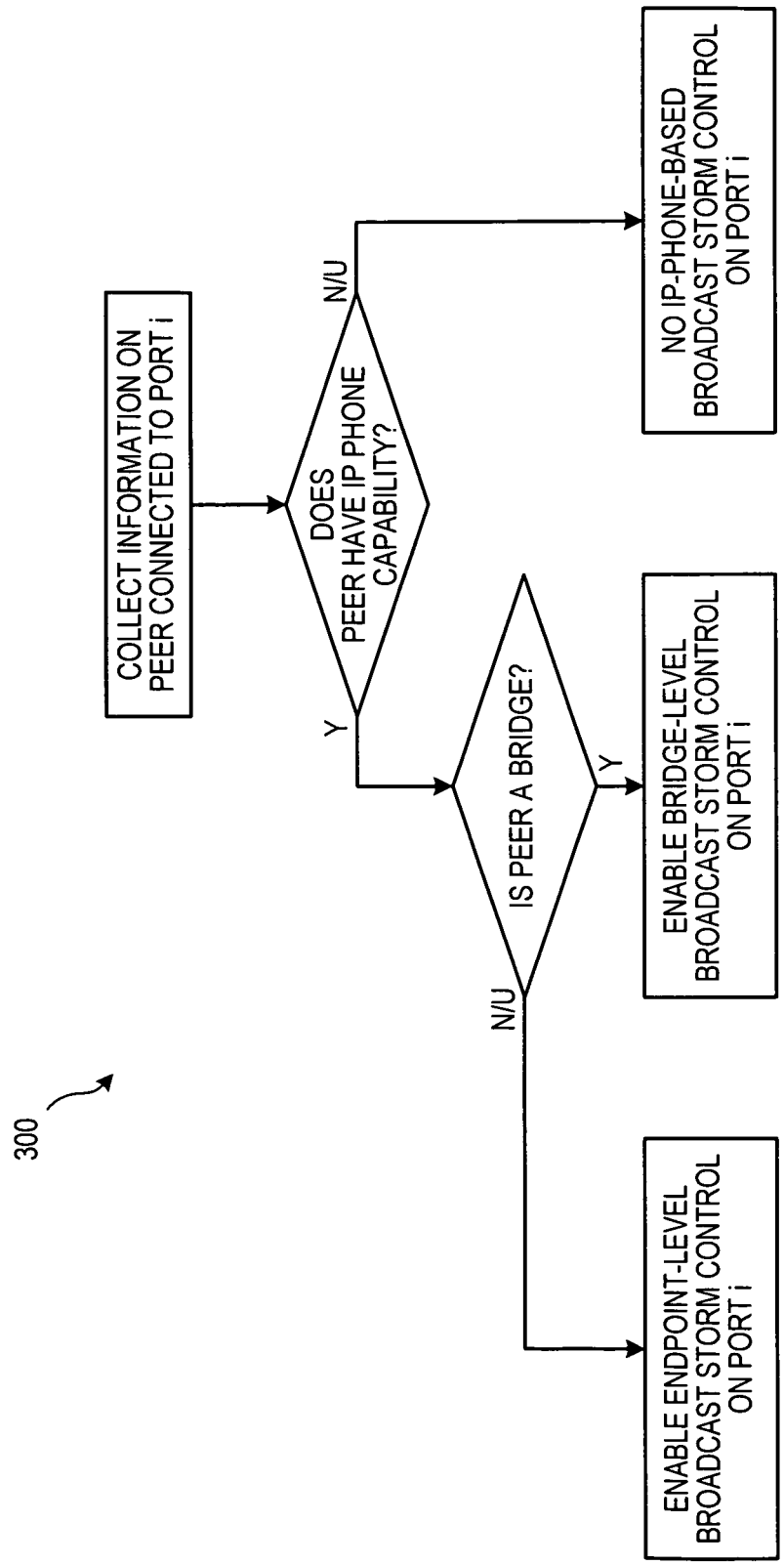
FIG. 3 contains a flow chart for logic to automatically enable broadcast storm protection on switch ports connected to IP phones.

In one embodiment, shown in FIG. 3 flowchart 300, the switch management function collects information on the peer device connected to a port i, where port i can be any port on the device. In one embodiment, all ports are checked upon system power-up, all ports on a line card are checked upon activation of a line card, and an individual port is checked upon change in status of the peer connected to that port or the port itself.

The information collected can be maintained, e.g., in a database or table having locations keyed to each chassis slot and port, such as the table 400 shown in FIG. 4. Table 400 contains fields for storing various types of information related to peer device capabilities, and for storing a current status for Broadcast Storm Control on that port. Examples of use of table 400 are explained further below.

Information collection by switch 200 on a peer device can rely on advertisements from each peer device, snooping of traffic, to/from the peer device, that passes through the switch, or interrogation of the peer device to discover its capabilities. In the first case, the switch management function receives advertisements from the device connected to a port, the advertisements conforming to LLDP (Link Layer Discovery Protocol, explained in further detail below) or a similar protocol. In the second case, the switch inspects packets to and from the peer, and looks for: packets addressed to or from a known ITU-T H.323 gatekeeper on the LAN; call signaling/setup packets to or from the peer such as those in ITU-T H.323, H.225.0, RAS (Registration, Admission, and Status), or H.245 format; and/or audio/video data packets to or from the peer such as those in ITU-T G.711, G.729, G.729a, H.261, H.263, or H.264 format. In the third case, a protocol on the switch can interrogate the peer device directly to discover VoIP capabilities, where both devices support such an interrogation protocol.

In one embodiment, advertisements received by the switch are in LLDP format. LLDP is defined in IEEE Standard 802.1AB, incorporated herein by reference. Extensions to base LLDP can be used as well, including organizationally specific custom-tailored extensions, or those that follow a standard such as ANSI-TIA-1057, "Link Layer Discovery Protocol for Media Endpoint Devices" (LLDP-MED), also incorporated herein by reference. LLDP is a one-way protocol that allows devices to advertise, to other peers on the same LAN segment, basic information about the device. This information is stored by recipients in a management information base (MIB), where it can be retrieved by a network management system and used by network administrators to "see" how their network is configured. Table 400 could be part of such a MIB on switch 200, or could be a separate table maintained for the purposes of one of the embodiments described herein.

An LLDP frame (or packet) contains standard IEEE 802 frame headers and a PDU (Protocol Data Unit) consisting of some number of TLVs (Type-Length-Value entries), which the recipient parses and stores in a MIB. A valid LLDP packet contains several mandatory TLVs, and can include other optional TLVs. The mandatory TLVs include a Chassis ID, Port ID, Time To Live (TTL), and End of LLDPDU TLV. The chassis/port ID TLVs allow the recipient to identify the sender and sender port. The TTL TLV contains a value that provides the recipient a length of time that it can consider the LLDP information valid (a TTL of 0 clears the LLDP information). In this embodiment, the chassis/port ID and TTL values for LLDP frames are parsed and stored in the appropriate fields shown in table 400. The End of LLDPDU TLV is placed after all other mandatory and optional TLVs, and signifies the end of the PDU.

Several optional TLVs can contain information useful in an embodiment. The basic management TLV set, defined in 802.1AB, includes a system capabilities TLV. The system capabilities TLV includes two bitmaps, one that defines the primary functions of the system, and one that indicates whether each such function is currently enabled. Both bitmaps use the same bit definitions for the functions Other, Repeater, Bridge, WLAN Access Point, Router, Telephone, DOCSIS cable device, and Station Only. In an embodiment, a device advertising a system capabilities TLV will cause the primary functions and enabled capabilities bitmaps to be stored in the table 400 on switch 200. A VoIP phone using this TLV would be expected to set the appropriate primary function bit for "Telephone," and might also set "Bridge" if it has an embedded layer 2 switch to a second port. When the VoIP function is enabled, the enabled capability bit for "Telephone" is set. Likewise, when the second port is connected to an active endpoint, the enabled capability bit for "Bridge" is set.

802.1AB also supports organizationally specific TLVs. The value portion of such a TLV is actually an embedded TLV, which allows an organization to combine its organizationally unique identifier (OUI) with its own defined subtype and content. An organizing body, enterprise, or vendor can, in an embodiment, define a subtype and content that can be used in an embodiment to automatically configure a switch port connected to a device advertising the defined information. For instance, certain TLV content can identify a device as an IP phone and one or more levels of control traffic capabilities, which the switch can use to set appropriate filters.

ANSI-TIA-1057 describes additional LLDP TLVs under the LLDP-MED extensions to 802.1AB. These extensions use organizationally specific TLVs with an OUI assigned to TIA for standards use. Within the LLDP-MED framework, a device advertises TLVs that describe, among other things, LLDP-MED Capabilities, Network Policy, and, optionally, Inventory Management. A Class III endpoint (which includes IP phones) also is required to implement the LLDP system capabilities TLV described above.

The LLDP-MED Capabilities TLV describes the type of endpoint. An IP phone is an LLDP-MED Class III Endpoint. A switch can parse this TLV to discover that the device is an IP phone.

The LLDP-MED Network Policy TLV describes intended uses of the network by the device. One such application type is "Voice," for use by dedicated IP Telephony handsets. A switch can parse this TLV to discover this intended use, or other similar intended uses.

The LLDP-MED Inventory Management TLV includes TLV subtypes for descriptions such as Manufacturer Name and Model Name. A switch can compare the contents of these TLVs to a translation table, which instructs the switch an appropriate level of filtering for that type of device.

Although LLDP-MED does not standardize the following types of information, it acknowledges that LLDP can be extended to include, among other things: further breakdown of IP phones according to capabilities such as basic IP phone, video phone, web phone, etc.; media types supported; device operational status; and calls in progress. Should a device advertise such information, the switch 200 can use the information to further refine the level of filtering for that device, or change it in real time depending on current usage of the device.

Returning to FIG. 3, switch 200 has collected information on the peer connected to a port i using, for example, one of the methods described above. Thus this process can run periodically, or each time information changes for a particular peer. The switch analyzes the information to determine whether the peer has IP phone capability. When the peer does not have such capability, or information necessary to make this determination is not in table 400, switch 200 does not enable IP-phone-based broadcast storm control on port i. When the peer does have IP phone capability, switch 200 additionally determines whether the peer acts as a bridge to a downstream device (this can be determined, e.g., by an LLDP system capabilities/enabled capabilities advertisement, from the presence of frames received from the IP phone with a source address of a different device, etc.). When the peer acts as a bridge, bridge-level broadcast storm control is enabled on port i. When the peer does not act as a bridge, or bridge status cannot be determined, endpoint-level broadcast storm control is enabled on port i. It is acknowledged that this is but one example—in other examples, only one level of broadcast storm control exists, whether a bridge function exists or not, or finer parsing of the IP phone's capabilities or current status (e.g., active call vs. idle) can allow the assignment of additional levels of broadcast storm control to port i. Each embodiment allows automatic control of broadcast storms, however, on switch ports according to defined peer attributes.

Broadcast storm control, as used herein, comprises actions taken by a switch that artificially limit outgoing broadcast traffic on a given switch port. Normally, broadcast traffic received by a switch on one LAN or VLAN (Virtual LAN) port is broadcast on every other switch port belonging to the same LAN or VLAN. In one embodiment, enabling broadcast storm control on a port causes the switch to rate limit or drop some/all outgoing broadcast packets on a port. A rate limit can be achieved, e.g., via rate limiters within egress processing that are specific to broadcast traffic. Broadcast packet drop can be activated via a broadcast traffic drop command that is temporarily issued by switch management when it senses a broadcast storm, and then withdrawn when broadcasts return to a more normal level. Different drop/forward rules can also be activated on different ports during storms, depending on the level of broadcast storm control enabled for each port. For instance, when an IP phone has a bridge enabled, some types of broadcast traffic may be dropped while others are allowed to pass, e.g., using filters that include the Ethertype field of the packet header in the drop/forward determination.

When an IP phone is configured for voice service on one VLAN and data service on another VLAN (e.g., for traffic bridged to a workstation connected to the IP phone), broadcast storm control can be differently configured on the port for the two VLANs, if so desired.

When different types of IP phones exist on a network and can be distinguished on their switch capabilities, one level of broadcast storm control can be tripped first for less-capable phones, with one or more additional levels of broadcast storm control available for more-capable phones. In such an embodiment, less severe broadcast storms may only cause BSC to be activated on some IP-phone ports, while more severe broadcast storms cause BSC to be activated on more IP-phone ports.

When an IP phone is capable of advertising whether it has an active call or not, or when the switch can snoop packets on a port to determine the recent presence of voice data packets, this information can also be used to dynamically set the level of broadcast storm control on a port. Extremely strict BSC can be enacted during an active call, with lesser or no BSC on the same port when no call is active.

In at least some embodiments, it is envisioned that a Command Line Interface or other switch management tool allow a network administrator to turn on/off or tailor a feature for automatic BSC control for IP phones. This interface can be as simple as a single command with an on or off argument, or can enable/disable more sophisticated features such as those described above for different levels/types of BSC.

A typical implementation will include software/firmware on a switch to: receive/interpret control traffic such as LLDP frames to determine peer capability information, or glean information from snooping traffic, and incorporate that information into a table, database, or other structure; and use the table, database, or other structure to automatically set a broadcast storm control level on its ports. The software/firmware can also sense/classify broadcast storms in some embodiments. A typical implementation will also include one or more broadcast-storm-control related rules in firmware, hardware, and/or lookup table form in egress processing to actively control broadcast packets when activated. Accordingly, embodiments can also include an apparatus (such as dynamic or static volatile memory, non-volatile semiconductor memory, magnetic storage, optical storage, local or network-connected) that contains the software/firmware instructions executed by one or more processors to implement an embodiment.

Those skilled in the art will appreciate that the embodiments and/or various features of the embodiments can be combined in other ways than those described. IP phones are not limited to voice-only phones. Likewise, embodiments are not limited to the IEEE 802 networks described in the examples, or to specific switch configurations. Switch management functions related to broadcast storm control, the per-port enablement of BSC, and/or IP-phone capability sensing can be centralized in a switch, distributed to processors local to a group of ports, or something in between. The specific method of implementing BSC will typically be driven, at least in part, by the hardware architecture and capabilities of the switch. Although H.323-based call control has been described in an embodiment, other protocols exist for the same purpose, including the IETF Session Initiation Protocol (SIP). A given embodiment that incorporates snooping can sense one or more specific IP phone protocol sets, depending on those protocols resident in the network. Many other examples of optimizations or implementation differences exist within the broad scope of this disclosure.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a packet switch, the method comprising:
    periodically collecting information on peer capabilities for a plurality of peer devices each connected respectively to at least one of a plurality of external ports of the packet switch, the collected information received via Link Layer Discovery Protocol (LLDP) packets and including information indicating a packet-based telephone capability for the peer devices;
    determining, for peer devices associated with information indicating the packet-based telephone capability, whether a bridge is being provided for a downstream device;
    configuring at least one packet processing device on the packet switch to limit broadcast packet traffic on at least one external port of the packet switch, the broadcast packet traffic limit including a first broadcast packet traffic limit in response to the collected information indicating that the peer device connected to the at least one external port contains a packet-based telephone capability, and the broadcast packet traffic limit including a second broadcast packet traffic limit in response to determining the peer device contains a packet-based telephone capability and is providing a bridge for a downstream device; and
    snooping packets and detecting the recent presence of voice data packets resulting from a first peer device being associated with an active call and, in response, dynamically changing the broadcast packet traffic limit of the first peer device to the first broadcast packet traffic limit when the first peer device contains a packet-based telephone capability and is engaged in the active call, and dynamically changing the broadcast packet traffic limit to the second broadcast packet traffic limit when the first peer device contains a packet-based telephone capability and is providing a bridge for a downstream device that is engaged in the active call.

2. The method of claim 1, wherein collecting information on peer capabilities comprises receiving advertisements from the peer devices, interpreting the contents of the advertisements to determine the peer capabilities, and storing the interpreted contents in a data structure.

3. The method of claim 2, wherein the received advertisements are LLDP packets having a plurality of type-length-value fields (TLVs) in each such packet.

4. The method of claim 3, wherein at least one TLV indicates functions of the peer device transmitting the advertisement, including whether the functions exist in the peer device and whether the existing functions are currently enabled.

5. The method of claim 3, wherein at least one TLV contains an organizationally-unique identifier and corresponding content, the corresponding content indicating a broadcast packet traffic limit requested by the peer device transmitting the advertisement.

6. The method of claim 3, wherein at least one TLV indicates an endpoint type, and wherein collecting information comprises parsing the endpoint type to determine whether the peer device transmitting the advertisement contains a packet-based telephone capability.

7. The method of claim 1, wherein collecting information on peer capabilities comprises snooping packets passing through the packet switch, the packets addressed to or from at least one of the peer devices, inferring from the contents of at least one header in one of the snooped packets a packet-based telephone capability for the peer device addressed in the snooped packet, and storing the inferred packet-based telephone capability for the peer device in a data structure.

8. The method of claim 7, wherein the snooped packets comprise at least one selected packet type from the group of packet types consisting of: packets addressed to or from a call setup gatekeeper; call signaling and setup packet addressed to a telephone peer device; audio data packets; video data packets; and combinations thereof.

9. The method of claim 1, further comprising interrogating at least one of the peer devices to cause the peer device to send, to the packet switch, information on peer capabilities.

10. The method of claim 1, wherein collecting information comprises periodically monitoring LLDP packets passing through at least one of the plurality of external ports for changes in the status of the peer device connected to that port.

11. The method of claim 10, wherein the broadcast packet traffic limit for the first peer device is modified for the duration of the active call.

12. The method of claim 1, wherein the determination that a bridge is being provided to the downstream device includes the collected information further including information indicating a bridge capability for the peer devices.

13. The method of claim 1, wherein the first broadcast packet traffic limit for the peer device that has a packet-based telephone capability but no bridge capability includes an endpoint-level broadcast storm control, and the second broadcast packet traffic limit for a peer device that has a packet-based telephone capability and a bridge capability includes a bridge-level broadcast storm control.

14. The method of claim 1, wherein setting of the second broadcast traffic limit further depends on whether the packet-based telephone capability and the bridge capability are enabled on a peer device.

15. The method of claim 12, wherein information indicating a bridge capability for a given one of the peer devices includes information indicating that the given one of the peer device is actually bridging packets for another device.

16. The method of claim 15, wherein configuring at least one packet processing device on the packet switch to limit broadcast packet traffic comprises, when the given one of the peer devices receives telephone packets on a first virtual local area network and bridged packets on a second virtual local area network, setting different broadcast packet traffic limits for the given one of the peer devices, depending on the virtual local area network on which the packet traffic is broadcast.

17. The method of claim 1, wherein limiting broadcast packet traffic comprises limiting at least one type of broadcast packet and not limiting at least one other type of broadcast packet.

18. An apparatus comprising a non-transitory, computer-readable medium containing computer instructions that, when executed by a packet switch comprising one or more processors, cause the packet switch to perform a method comprising:
- periodically collecting information on peer capabilities for a plurality of peer devices each connected respectively to at least one of a plurality of external ports of the packet switch, the collected information received via Link Layer Discovery Protocol (LLDP) packets and including information indicating a packet-based telephone capability for the peer devices;
- determining, for peer devices associated with information indicating the packet-based telephone capability, whether a bridge is being provided for a downstream device;
- configuring at least one packet processing device on the packet switch to limit broadcast packet traffic on at least one external port of the packet switch, the broadcast packet traffic limit including a first broadcast packet traffic limit in response to the collected information indicating that the peer device connected to the at least one external port contains a packet-based telephone capability, and the broadcast packet traffic limit including a second broadcast packet traffic limit in response to determining the peer device contains a packet-based telephone capability and is providing a bridge for a downstream device; and
- snooping packets and detecting the recent presence of voice data packets resulting from a first peer device being associated with an active call and, in response, dynamically changing the broadcast packet traffic limit of the first peer device to the first broadcast packet traffic limit when the first peer device contains a packet-based telephone capability and is engaged in the active call, and dynamically changing the broadcast packet traffic limit to the second broadcast packet traffic limit when the first peer device contains a packet-based telephone capability and is providing a bridge for a downstream device that is engaged in the active call.

19. A modular packet switch comprising:
- a plurality of external ports;
- a switch controller that periodically collects information on peer capabilities of peer devices connected to the plurality of external ports, the collected information received via Link Layer Discovery Protocol (LLDP) packets and including information indicating a packet-based telephone capability for the peer devices and a bridge capability of the peer devices; and
- at least one packet processor to process packets sent out on the plurality of external ports, at least one of the packet processors having a per-port broadcast packet traffic limit facility, the switch controller selectively activating the per-port broadcast traffic limit facility for at least one of the plurality of external ports, the activated per-port broadcast traffic limit facility including a first broadcast packet traffic limit in response to collected information indicating that the peer device connected to that external port has a packet-based telephone capability, and the activated per-port broadcast traffic limit facility including a second broadcast packet traffic limit in response to determining the peer device contains a packet-based telephone capability and is providing a bridge for a downstream device;
- wherein the switch controller snoops packets and detects the recent presence of voice data packets resulting from a first peer device being associated with an active call and, in response, dynamically changes the broadcast packet traffic limit of the first peer device to the first broadcast packet traffic limit when the first peer device contains a packet-based telephone capability and is engaged in the active call, and dynamically changes the broadcast packet traffic limit to the second broadcast packet traffic limit when the first peer device contains a packet-based telephone capability and is providing a bridge for a downstream device that is engaged in the active call.

20. The modular packet switch of claim 19, wherein the broadcast packet traffic limit facility allows multiple levels of broadcast packet traffic limits, the switch controller selectively activating one of the levels of broadcast packet traffic limits based on specific collected information on the peer device having the packet-based telephone capability.

21. The modular packet switch of claim 20, wherein the specific collected information includes a collected peer characteristic selected from the group of characteristics consisting of: an enabled-bridge status; a connected-bridge status; the presence of an active call on the peer device; an organizationally-unique advertisement corresponding to a given level of broadcast traffic limit; an endpoint type; the assignment of multiple virtual local area network identifiers to the external port linked to the peer device; and combinations thereof.

* * * * *